United States Patent
Wirola et al.

(10) Patent No.: US 9,560,532 B2
(45) Date of Patent: *Jan. 31, 2017

(54) SIGNAL STRENGTH PROFILING

(71) Applicant: Nokia Technologies Oy, Espoo (FI)

(72) Inventors: Lauri Wirola, Tampere (FI); Jari Syrjarinne, Tampere (FI); Laura Maria Wirola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,572

(22) Filed: Jun. 25, 2015

(65) Prior Publication Data

US 2015/0296389 A1 Oct. 15, 2015

Related U.S. Application Data

(62) Division of application No. 13/821,583, filed as application No. PCT/IB2010/054102 on Sep. 10, 2010, now Pat. No. 9,113,434.

(51) Int. Cl.
| | |
|---|---|
| *H04W 24/00* | (2009.01) |
| *H04W 16/24* | (2009.01) |
| *H04W 64/00* | (2009.01) |
| *G01S 5/02* | (2010.01) |
| *G01S 5/14* | (2006.01) |
| *H04W 24/08* | (2009.01) |

(52) U.S. Cl.
CPC ............ *H04W 16/24* (2013.01); *G01S 5/0252* (2013.01); *G01S 5/14* (2013.01); *H04W 64/00* (2013.01); *H04W 64/003* (2013.01); *H04W 24/08* (2013.01)

(58) Field of Classification Search
CPC ........ H04W 4/02; H04W 4/021; H04W 16/18; H04W 16/24; H04W 24/00; H04W 64/00; H04W 64/003
USPC ........................................... 455/500
See application file for complete search history.

(56) References Cited

U.S. PATENT DOCUMENTS

| | | | | |
|---|---|---|---|---|
| 6,466,797 | B1 * | 10/2002 | Frodigh ................ | H04W 24/00 370/332 |
| 8,150,344 | B1 * | 4/2012 | Goyal ................... | H04W 24/02 455/130 |
| 2005/0261004 | A1 * | 11/2005 | Dietrich ................... | G01S 5/02 455/456.2 |
| 2006/0176849 | A1 * | 8/2006 | Gass ...................... | H04W 64/00 370/328 |
| 2008/0057978 | A1 * | 3/2008 | Karaoguz ............. | H04W 48/16 455/456.3 |

\* cited by examiner

*Primary Examiner* — Marcus Hammonds
(74) *Attorney, Agent, or Firm* — Locke Lord LLP

(57) ABSTRACT

A system for supporting electronic positioning in apparatuses. Apparatuses may receive various wireless signals over time. The strength of the received wireless signals may be determined by the apparatuses, and based on this determination an occurrence for each received wireless signal may be accumulated in a histogram in the apparatus. Information based on the histogram may then be transmitted to a mapping database. The mapping database may then utilize this information to, for example, create signal-based maps for use in apparatus positioning.

6 Claims, 11 Drawing Sheets

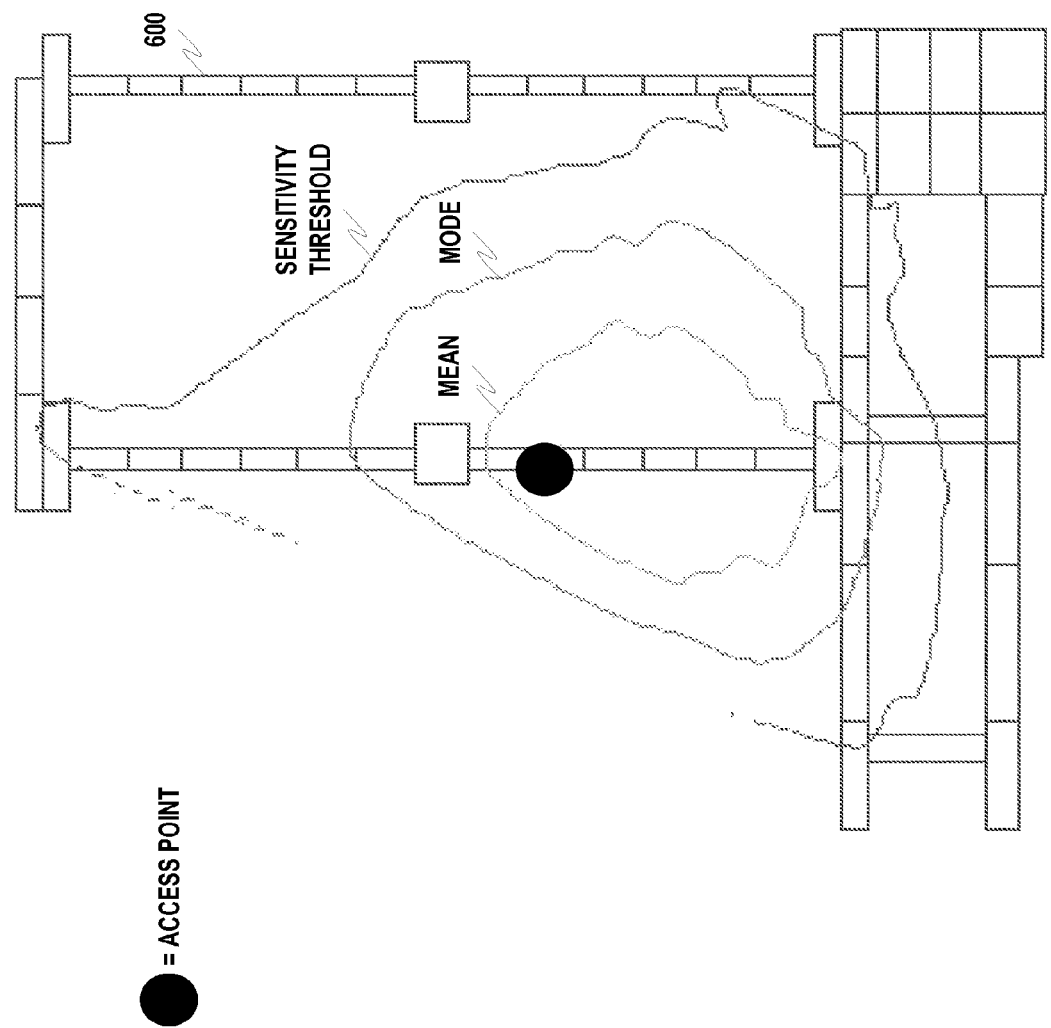

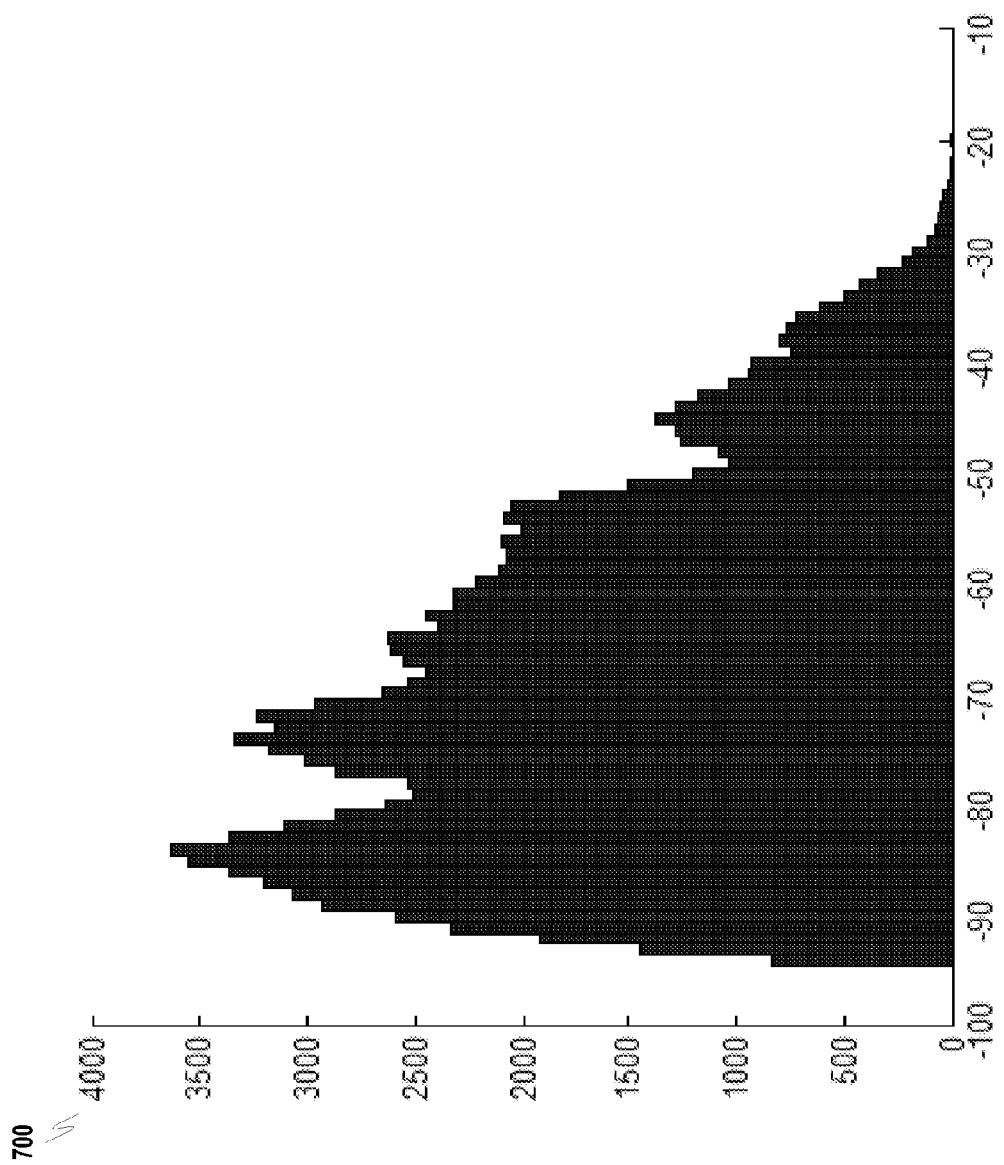

SIGNAL STRENGTH PROFILING

This is a divisional application of co-pending patent application Ser. No. 13/821,583 filed on May 21, 2013 (hereby incorporated by reference), which is the U.S. National Stage of International application number PCT/IB2010/054102 filed on Sep. 10, 2010 which was published in English on Mar. 15, 2012 under International Publication number WO 2012/032376.

BACKGROUND

1. Field of Invention

The present invention relates to electronic positioning, and in particular, to collecting and normalizing electronic signal information for use in signal-based mapping.

2. Background

The integration of wireless communication functionality into both existing and emerging applications continues to expand. Strong demand has spurred developers to not only create more powerful communication devices, but also to introduce other helpful applications that rely upon wireless communication for support. In this manner, wireless communication has moved beyond the mere conveyance of voice data, and has evolved to make possible various applications for personal productivity, business, entertainment, etc.

At least one popular communication-based application that has emerged is electronic positioning. Electronic positioning may provide current location information for apparatuses in terms of coordinates, in relation to visual presentation (e.g., map), etc. However, the means for obtaining information upon which a position is determined may vary. For example, apparatuses may include Global Positioning System (GPS) receivers for obtaining the electronic positioning information from satellites. Long-range wireless communication systems (e.g., cellular) may also provide positioning information through methods such as cell-based triangulation, while short-range wireless systems may be able to provide information through determination of proximity to wireless access points, etc.

These wireless communication systems may serve as adequate sources of information for supporting positioning systems in the out-of-doors because, in addition to position information being readily available for providing quick position resolution, maps for most populated regions are available and frequently updated. However, these same advantages do not exist when attempting to implement electronic positioning inside of a structure (e.g., buildings). Accurate map information (or any map information) is often not available, and the electronic positioning signals relied upon for outside positioning may not be as dependable based on the prevalent sources of interference that are found inside of structures. As a result, electronic position resolution within a structure may be very slow, if even available, and may be lack the accuracy required to be effective.

SUMMARY

Example embodiments of the present invention may be directed to a method, computer program product, apparatus and system for supporting electronic positioning in apparatuses. Apparatuses may receive various wireless signals over time. The strength of the received wireless signals may be determined by the apparatuses, and based on this determination an occurrence for each received wireless signal may be accumulated in a histogram in the apparatus. Information based on the histogram may then be transmitted to a mapping database. The mapping database may then utilize this information to, for example, create signal-based maps for use in apparatus positioning.

In at least one example implementation, apparatuses may receive wireless signals while a user is traversing a particular geographic area. These wireless signals may be received from other wireless communication apparatuses, like access points, residing in or near the particular geographic area. Upon receiving these signals, apparatuses may determine a source for each signal (e.g., a particular access point) based on information contained in each received signal and may measure the strength of each received signal. The signal strength information may be accumulated in a histogram within the apparatus. Signal source identification and/or information derived from the histogram may be used in the apparatus for positioning purposes. It may also be possible for this information to be transmitted to the mapping database for use in coverage area map formulation, or in some instances, for requesting remote positioning assistance. Information derived from the histogram may comprise one or more of maximum signal strength, minimum signal strength, median signal strength, mode signal strength, and mean signal strength and at least one of quartile and tertile signal strength ranges based on signal strength probability mass, or other information that may be usable by the mapping database for scaling, filtering or normalizing signal strength information. In some instances, filtering based on parameters such as received signal strength may occur prior to any information being sent to the mapping database.

Source identification and information derived from histograms in various apparatuses may be received at a mapping database. In instances where this information is for use in coverage area map formulation, filtering based on parameters such as a threshold signal strength value may be performed prior to use. In instances where the mapping database receives a request for positioning assistance from an apparatus, the mapping database may reply to the request by indicating a type of coverage area map to utilize for positioning in the requesting apparatus. Alternatively, responses may comprise threshold signal strength information for use selecting received signals for positioning, the identification of certain signal sources, etc. Threshold signal strength may, for example, specify a minimum signal strength for use in positioning so that only signals having a signal strength over the threshold value are used to determine apparatus position.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 6A discloses an example signal strength disposition in accordance with at least one embodiment of the present invention.

FIG. 7 discloses an example histogram based on received signal strength in accordance with at least one embodiment of the present invention.

DESCRIPTION OF EXAMPLE EMBODIMENTS

Figure 1:
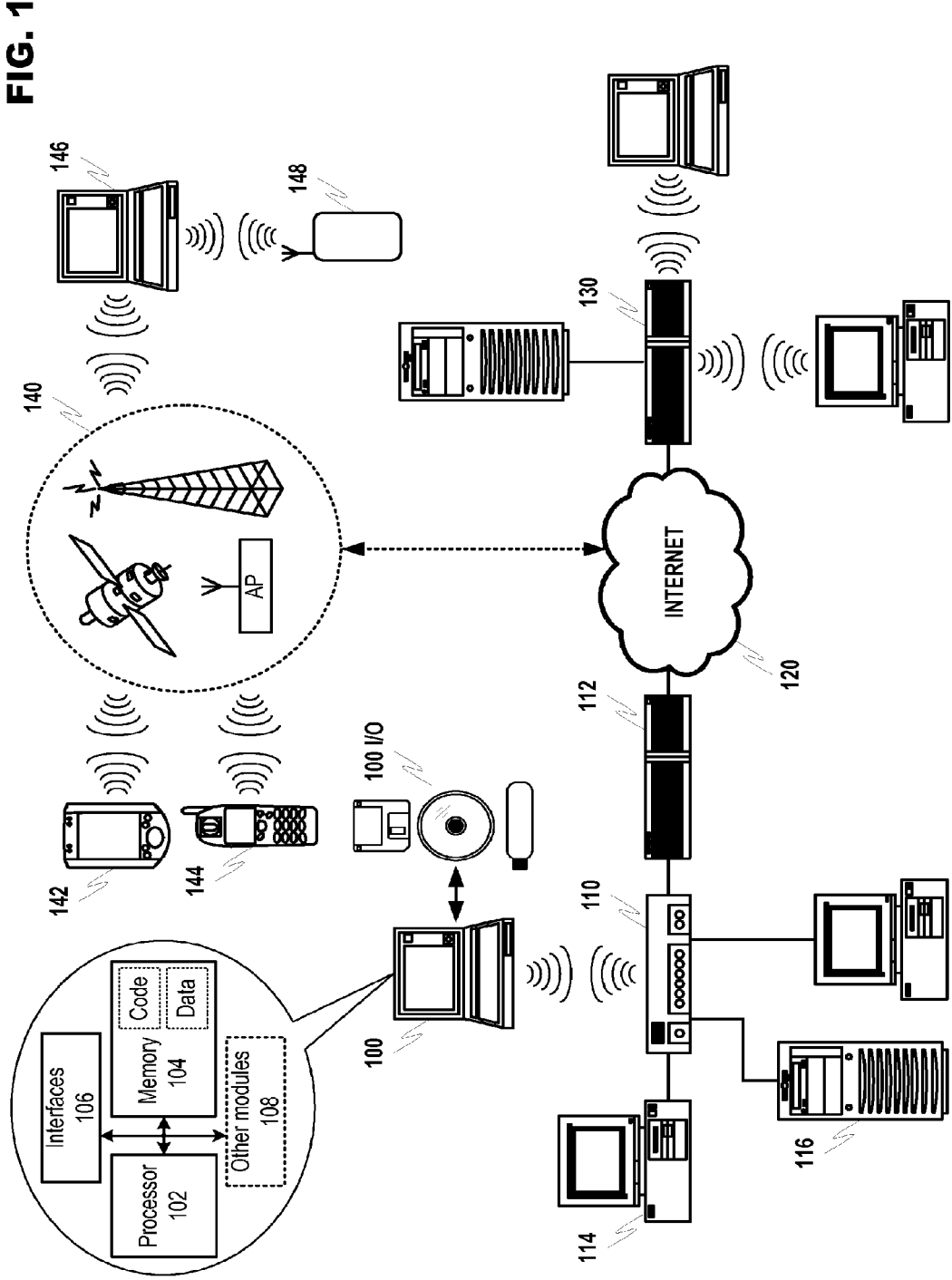
FIG. 1 discloses example apparatuses, communication configuration and network architecture usable in implementing at least one embodiment of the present invention.

While the invention has been described below in terms of a multitude of example embodiments, various changes can be made therein without departing from the spirit and scope of the invention, as described in the appended claims.

I. Example System with which Embodiments of the Present Invention may be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 2:
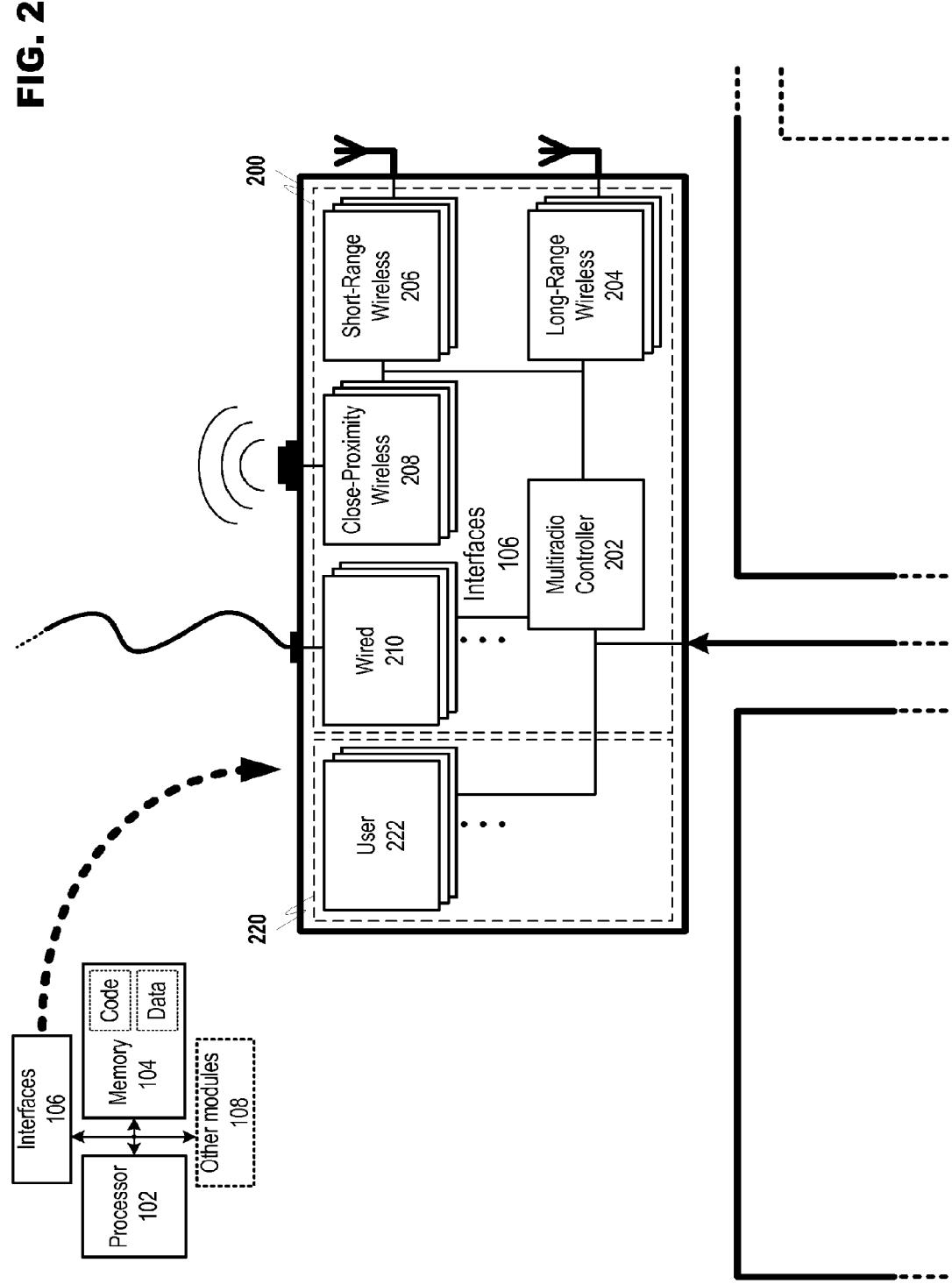
FIG. 2 discloses additional detail with respect to example communication interfaces usable with at least one embodiment of the present invention.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

Figure 3:
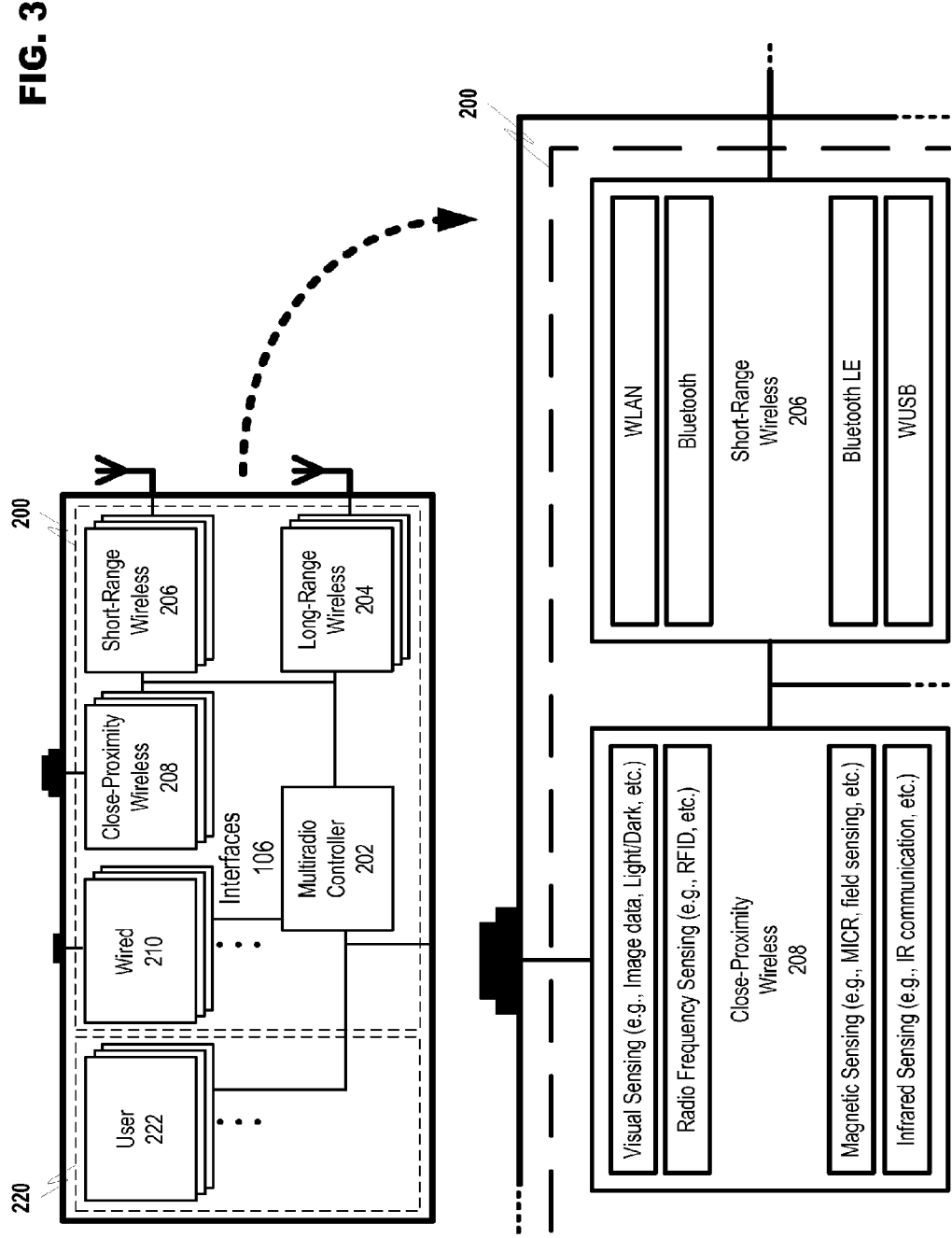
FIG. 3 discloses additional detail with respect to example close proximity and short range wireless resources usable with at least one embodiment of the present invention.

The example communication interface configuration 106 disclosed in FIG. 2 may, in accordance with at least one embodiment of the present invention, further comprise example close-proximity wireless interfaces 208 such as set forth in FIG. 3. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, transmission/reception interfaces for Near Field Communication (NFC), radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth (BT) communication, Bluetooth Low Energy (BTLE) communication, wireless Universal Serial Bus (WUSB) communication, Ultra-wideband (UWB), etc. These forms of communication may, in various applications, support wireless interaction between two or more handheld wireless communication devices, between handheld wireless communication devices and stationary access points (AP), to peripheral interface devices, etc.

II. Example Operational Environment

Assisted global positioning (A-GPS) and other electronic positioning solutions based on wireless communication may perform acceptably and may provide extensive coverage outdoors where the signal quality and number of satellites/base stations are typically very good. This performance may be bolstered by accurate maps featuring terrain features, roads, traffic conditions and other related information have been mapped exhaustively and are constantly maintained from satellite images, aerial photography, feedback from user communities, etc. Together, the available positioning solutions and the feature-rich maps may provide excellent user experiences (e.g., such as in instances including vehicle and pedestrian navigation use).

The situation becomes totally different when the navigation is brought indoors. Known positioning technologies have very limited capabilities indoors, and thus, usually fail. There are many reasons for these failures. Initially, existing positioning/mapping solutions may be expensive and difficult to implement. Map information does not exist for many public/private structures, and the provision of this information requires extensive modeling visualization and/or mapping that is currently only provided by private companies. Further, existing solutions may provide unstable and/or unpredictable performance, which may occur to do external positioning signals being unavailable or unreliable and indoor signals lacking sufficient position resolution.

The various embodiments of the present invention may provide a means for faster and more accurate position determination in scenarios where traditional positioning techniques may be unavailable or inadequate. An example of a problematic situation is providing electronic positioning within a structure such as a building. While positioning within a building will be utilized for the sake of explanation herein, the various embodiments of the present invention are not limited only to use in this specific application. Almost any situation where traditional positioning techniques do not provide adequate performance (e.g., speed, resolution, etc.) may experience improvement through the following example embodiments and/or implementations of the present invention.

Figure 4:
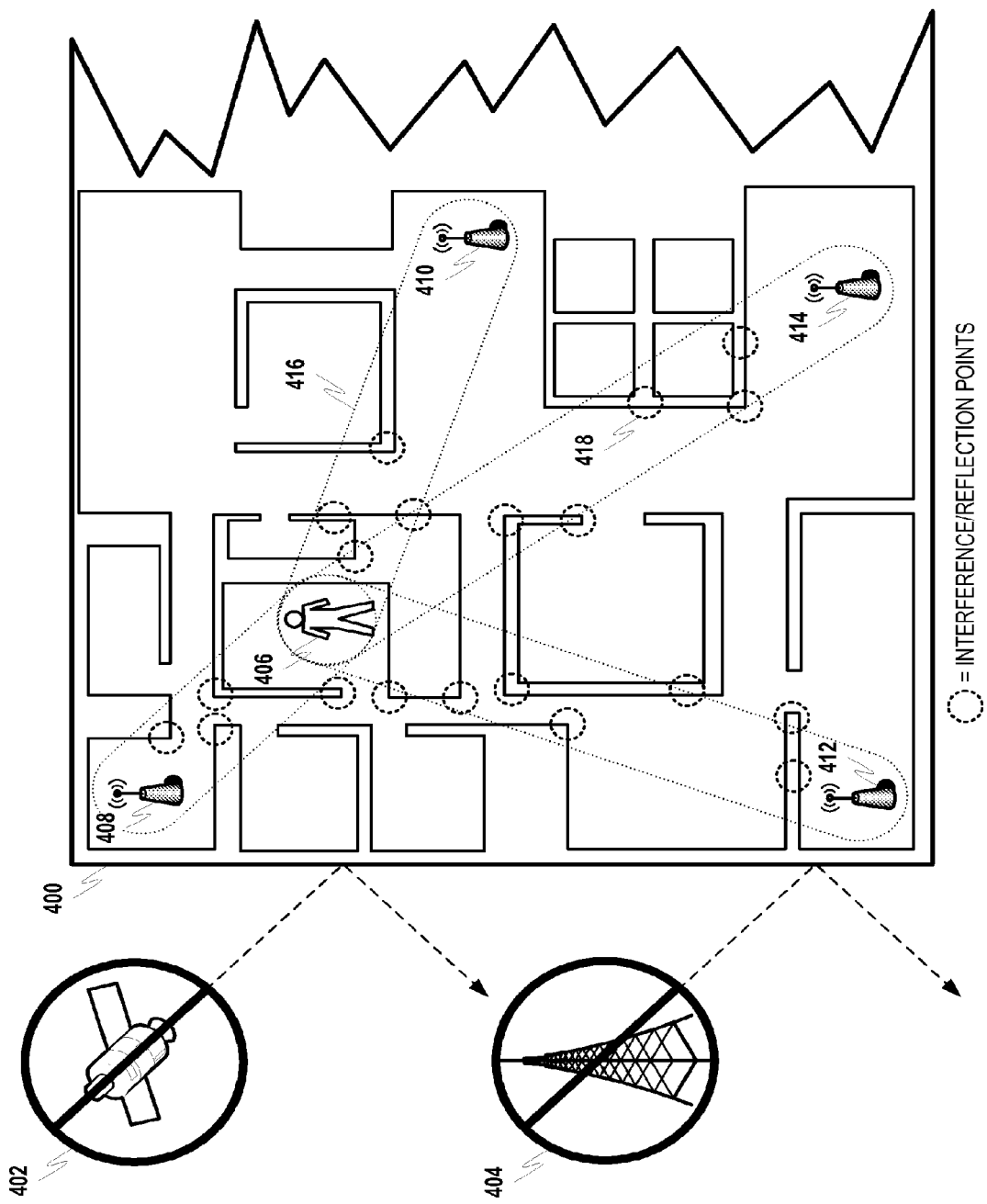
FIG. 4 discloses an example operational environment and the challenges presented therein in accordance with at least one embodiment of the present invention.

Partial floor plan 400 disclosed in FIG. 4 will help to explain various challenges to traditional electronic positioning that may be experienced within a structure (e.g., building). Information received from satellites 402 and long-range transmission 404 (e.g., cellular) may be effective when outside where these signals may be efficiently received. However, some structures may totally block, significantly reflect, or just render such long-range signals unreliable so as to create unacceptable results for positioning purposes as shown in FIG. 4. User 406 (e.g., a user that is equipped with, or is carrying, at least one apparatus such as the example apparatuses previously described herein) may then have to rely on wireless electronic communication provided within a building in order to electronically determine position. For example, wireless access points (AP) 408, 410, 412 and 414 may provide electronic wireless communication as shown in floor plan 400. In additional to simply providing data communication (e.g., access to the LAN or WAN resources such as the Internet), these access points may also provide positioning information. Various methods for determining position may be employed, each with differing amounts of accuracy. For example, connection 416 to a particular AP (e.g., AP 408) indicates that user 406 is within communication range of that AP. However, the resolution provided by such an estimation is extremely inexact, especially within the smaller confines of a building.

Further, signals from various access points may be utilized for various position finding algorithms. For example location triangulation based on connection to more than one AP or direct-of-arrival (DoA) estimation in order to determine the relative direction from a receiver towards the emitter of a signal may be employed. However, the various signals 416 emitted by AP 408-414 may experience substantial interference/reflection points 418 within a building or structure. For example, walls containing metallic conduits, hallways containing various corners and other objects, elevator shafts and other high power equipment may cause signal interference or reflection 418. Interference/reflection points 418 may result in AP signals 416 being delayed significantly, or not being received at all. Further, these signals may be received from directions that do not indicate the actual direction from which the signal was originally sent, and thus, may cause delays or inaccuracy when employing these traditional position finding techniques.

III. Example Positioning Based on Signal Strength Fingerprints

As set forth above, fingerprints may comprise various types of information sensed by apparatuses at a particular location. While various types of information may be sensed (e.g., visual, electronic, magnetic, etc.), the following disclosure will focus on how wireless communication signal information may be collected/processed for explaining the various embodiments of the present invention. However, the various embodiments of the present invention are not limited to being implemented only with wireless communication signals, and may therefore be applied to any similar scenario in which information sensed by an apparatus is collected and/or processed for use in determining apparatus position.

Radio-based positioning/mapping technologies may utilize communication node coverage area information to estimate apparatus position. Such technologies may be implemented using long-range wireless systems (e.g., cellular network base stations) or short-range wireless transmission devices like WLAN access points (APs). Position may then be estimated based on models that describe system configuration and/or geographic features for a coverage area. Coverage area models may come in various forms. For example, in cellular networks position estimation may be based on model information including base station location, antenna azimuth, beam width and transmission range. Moreover, geographical information may also be utilized to model radio propagation based on propagation models.

In instances where positioning is based on short-range wireless signals, multiple samples (e.g., fingerprints) may be collected using apparatuses that also include some sort of independent positioning capability, such as a GPS receiver. The signal characteristics and position information may be used in formulating radio signal-based maps, or radiomaps, for use in providing position estimation to other apparatuses that do not contain dedicated positioning resources. Example fingerprints may include fingerprint location and a list of communication node identities (e.g., Cell IDs or WLAN AP MAC addresses). Moreover, observed signal strength values and various other pieces of information may be included in fingerprints in order to link the strength of sensed signals to the actual location of the apparatus. The fingerprints may then be refined in various ways to formulate a coverage area model/radiomap. One option may be to simply model the maximum coverage area. Alternatively, a coverage area may be modeled statistically. For example, coverage areas may be considered as Gaussian distributions or mixtures. In such instances coverage area models actually model a distribution of fingerprint collectors (users) within the true node coverage area.

In example position determination processes apparatuses may receive signals from various communication nodes and may use information within the received signals to determine the identities of the signal sources. Apparatus position may then be estimated based on the intersection of the node coverage areas. Alternatively, coverage areas may be modeled as statistical objects having mean and covariance. The coverage areas of transmitting apparatuses (e.g., APs) may be considered as, for example, Gaussian measurements. Modeling the area in this manner may, for example, allow for deducing a mean or maximum a posteriori (MAP) estimate of the location of the apparatus.

Figure 5A:
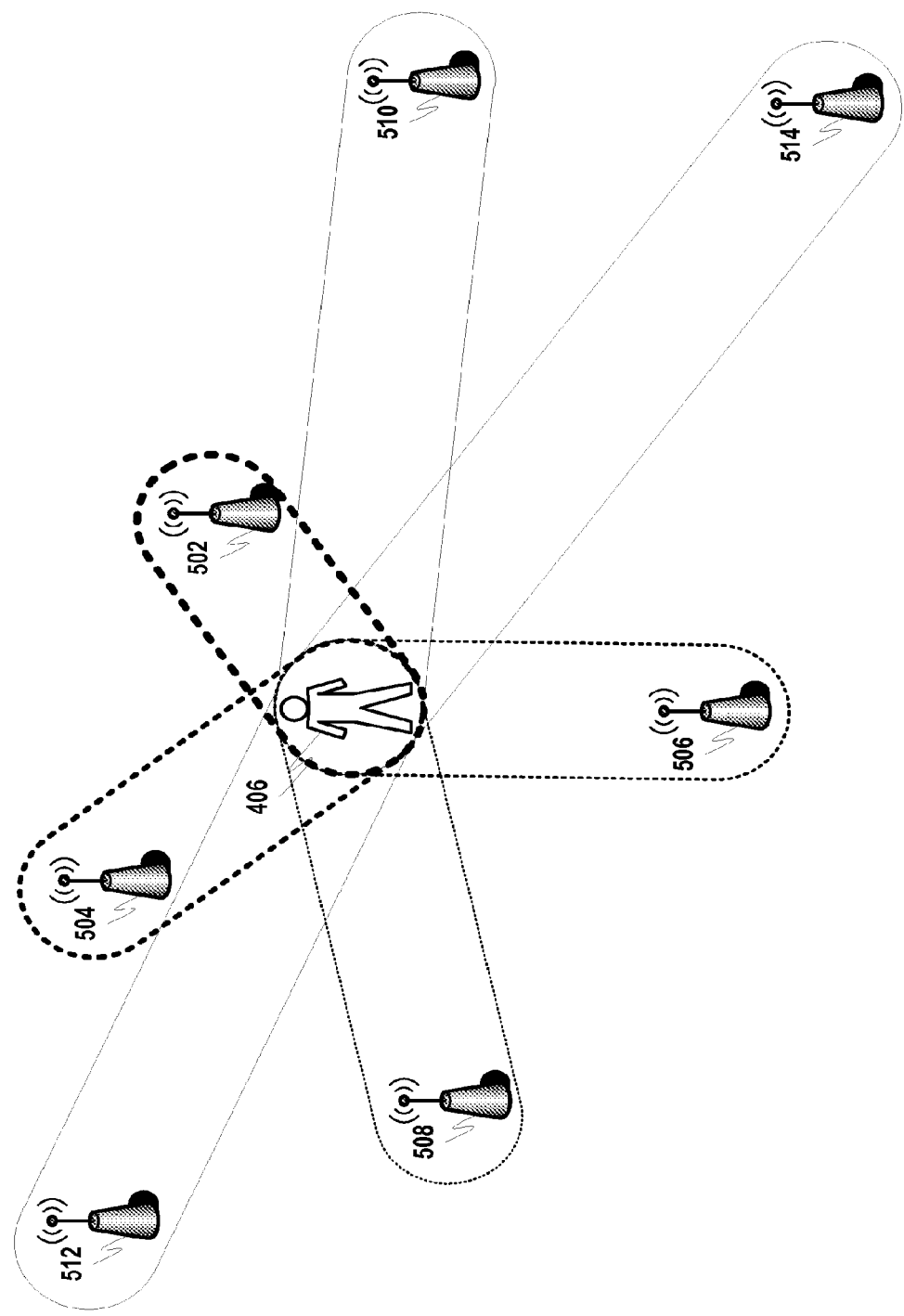
FIG. 5A discloses an example electronic positioning scenario based on wireless signals received by an apparatus in accordance with at least one embodiment of the present invention.

However, it is possible that considering all available information when an apparatus is determining position may lead to inaccurate estimates. FIG. 5A discloses an example scenario in this regard which builds upon the example set forth in FIG. 4. An apparatus possessed by user 406 may receive signals from many access points that are within range of the current position of user 406. For example, in FIG. 5A the apparatus may receive transmissions from APs 502-514. APs 502-514 reside at different distances from user 406, and thus, the strength of each received signal is different as signified by the thickness of the lines describing the signals in FIG. 5A. For example, the signals received from AP 502 are darkest since AP 502 is situated closest to user 406, while the signals received from APs 510-514 are represented very lightly since these APs are situated further away. It may seem logical that the more information that is available, the more accurate the estimation. However, FIG. 5B will demonstrate that the large expanse of area 500 may actually contribute in inaccuracy in position determination.

Figure 5B:
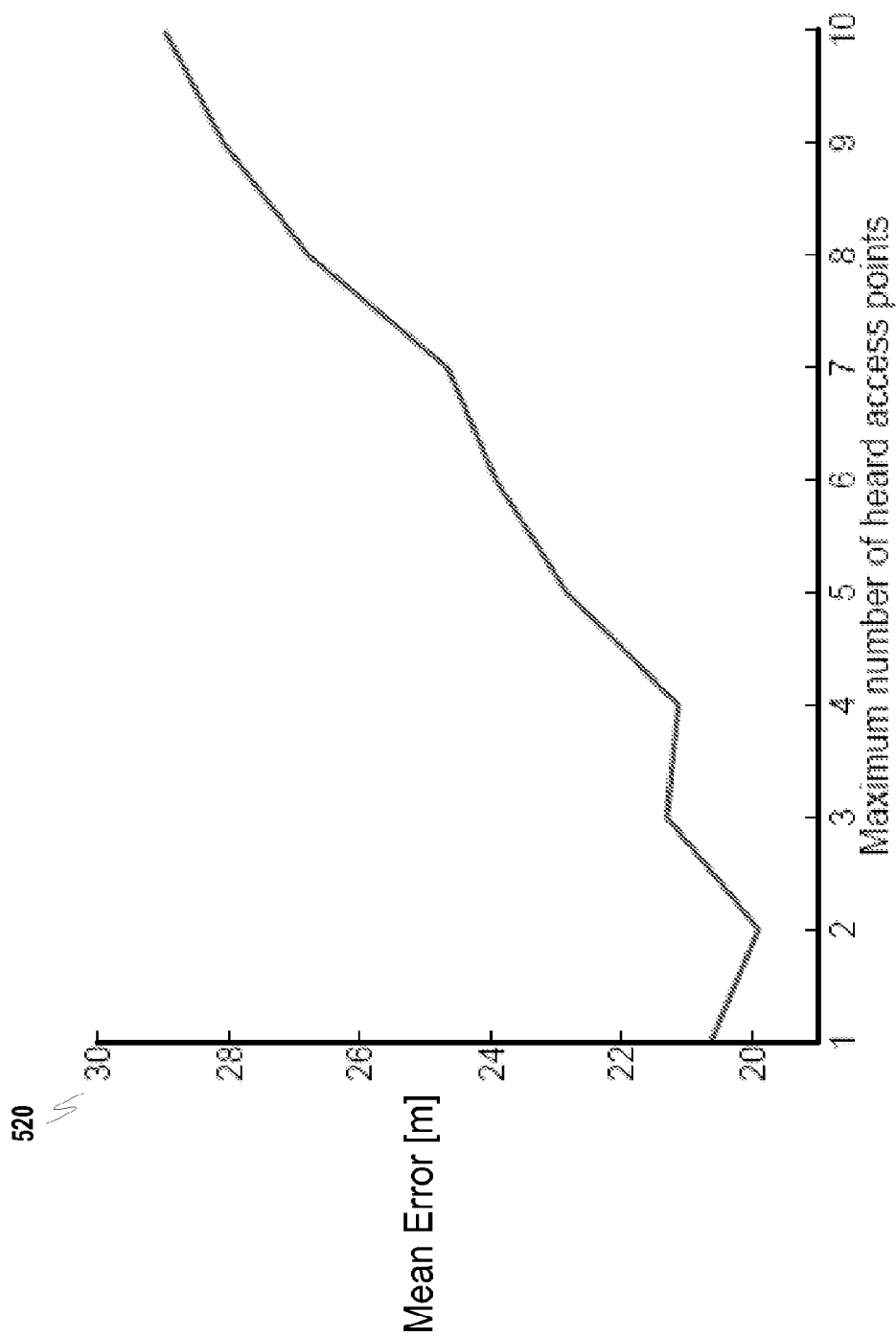
FIG. 5B discloses an example of the relationship between positioning error and signal sources in accordance with at least one embodiment of the present invention.

FIG. 5B discloses an error chart 520 in which the number of WLAN APs used in positioning has been mapped versus mean error in meters. Positioning in FIG. 5B is based on having Gaussian coverage area models and an apparatus assigned to a location that is the weighted average of the coverage area center points. Contrary to what could be expected, the error was seen to increase when the number of used WLAN APs increases. The increased error may be due in part to uncertainty that is introduced when the number of detected APs increases in that a larger share of the observed APs are actually situated further away from the apparatus. An increased number of distant APs may influence the accuracy of the location estimate (e.g., draw the estimate towards the more distant APs).

IV. Increasing Accuracy by Limiting the Information used in Positioning

These results demonstrate a need to limit the fingerprints used in forming the coverage area models as well as to somehow select a subset of the observed APs for positioning. Limiting coverage area based on received signal strength indication (RSSI) values during the radiomap learning process may provide increased positioning accuracy through the more selective utilization of information. FIG. 6A discloses equi-signal strength boundaries corresponding to mean, mode and minimum (sensitivity threshold) RSSI values for an example access point in a structure 600. Interestingly, the greater the signal strength value used as the boundary value, the better the coverage area mimics a symmetric shape including ellipses. Ellipses are commonly used for modeling coverage areas, especially in cases where the coverage area is considered in statistical manner.

Figure 6B:
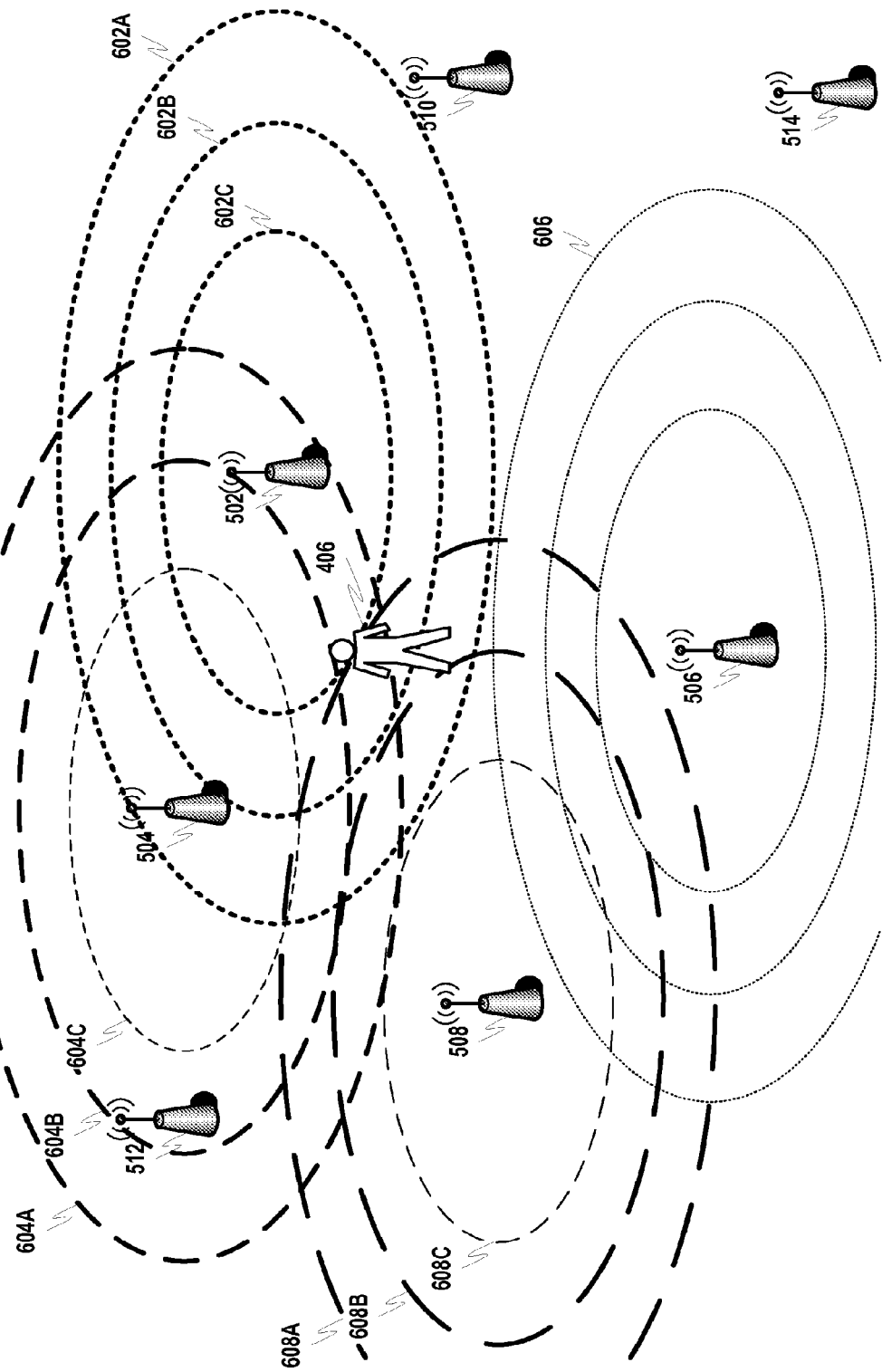
FIG. 6B discloses an example electronic positioning scenario based on a reduced number of wireless signals received by an apparatus in accordance with at least one embodiment of the present invention.

Now referring to FIG. 6B, example elliptical RSSI measurements for each of APs 502-508 is now disclosed. APs 510-514 have been omitted in order to provide some clarity in FIG. 6B, but these APs may exhibit similar strength boundaries. For example, ellipses 602A-C may model the mean, mode and minimum RSSI observed by user 406 for AP 502. Likewise, ellipses 604A-C may correspond to similar values observed by user 406 for AP 504 and ellipses 608A-C may correspond to similar values for AP 508. The coverage area may be modeled as the covariance of the multi-normal distribution that has an elliptical geometrical shape. Therefore, it may be advantageous to formulate coverage area models considering only the fingerprints that have RSSI values that exceed a threshold value. In FIG. 6B, some of these observed signal RSSI values may be strong enough (e.g., over a threshold RSSI value) to be used for reporting, positioning, etc. Usable observed RSSI values are indicated by heavier lines in FIG. 6B. For example, any of the observed signals 602A-C may be usable by user 406, depending on the particular coverage area model employed, due to the close proximity of AP 502. On the other hand, the signal strength of AP 506 may be too weak for use in reporting to the mapping database, for positioning, etc. Some of the observed RSSI values (e.g., 604A-B and 608A-B) may be usable from APs 504-508. An improvement in positioning accuracy may be achieved when using coverage area models that have been formed considering only fingerprints in which RSSI values for sensed APs exceed some threshold value, such as mean, median and mode average RSSI values.

When coverage area models are based on observed RSSI values that are greater than mean (">mean RSSI"), only fingerprints (FPs) with RSSI values exceeding mean value are used in coverage area modeling. Similarly, when performing location estimation in view of the these coverage area models, only APs that are observed to have RSSIs exceeding the mean value will be used in positioning. Both of these requirements exclude APs that are further away from the terminal so that only the closest APs are taken into account. It can be observed that, in general, operating using such threshold value requirements may halve positioning error. However, an issue to consider when using RSSI values is that WLAN chipset vendors may utilize different RSSI definitions that result in RSSI scales and offsets that vary between chipsets. For example, the same physical signal strength range (e.g., [−30, −20] dB ref 1 mW) may be expressed as an RSSI range [0, 10] in one chipset and an RSSI range [−40,−20] in another. These differences present a challenge when formulating coverage area models based on RSSI since fingerprints may be contributed by a wide range of apparatuses utilizing a wide range of chipsets, and any radiomaps resulting from the contribution of fingerprint information may be used to position a various apparatuses having the same chipset issues. Moreover, apparatuses that contain the same chipsets may also exhibit different situational performance. Parameters such as apparatus condition (e.g., was the apparatus recently calibrated, repaired, dropped or damaged in some manner), configuration (e.g., contained in a case or carrier), current apparatus power, loading or processing levels, etc. may also affect sensitivity. The use of histograms to normalize sensing operation eliminates the need to known this information.

In accordance with at least one embodiment of the present invention, the accuracy of positioning may be enhanced by collecting histogram data on observed RSSI values both in apparatuses that are collecting fingerprints and in apparatuses performing positioning based on established coverage area models. When the number of observed RSSI values increases, the collection of histogram data may provide data that converges towards real distributions of RSSI values in a given apparatus. When reporting fingerprints, which in some instances may comprise providing location information along with signal source identification information (e.g., WLAN ID) corresponding to received signals and RSSI values for received signals, apparatuses may also report histogram characteristic values. Example characteristic values may include maximum received signal strength, minimum received signal strength, mean average received signal strength, median average received signal strength, mode average received signal strength, and quartile and/or tertile received signal strength ranges based on signal strength probability mass. Coverage area models may be based on fingerprints having RSSI values greater than the given characteristics, and thus, even if "median" RSSI varies from apparatus to apparatus, the fact that apparatuses also report the RSSI value corresponding to the signal characteristic "median" deduced from histograms with large sample space allows for coherent "median" coverage area models to formulated. The histogram characteristics, such as median, used to limit the set of fingerprints used for modeling may be stored along with the coverage area model, which may allow for normalizing the concept of characteristic "median" across various apparatus types. This allows apparatuses to utilize only those APs for which the observed RSSI exceeds the characteristic RSSI value based on which the models have been formed.

Accurate coverage area models based on fingerprints exhibiting minimum signal strength (e.g., >mean) cannot simply be based upon setting an RSSI limit to some globally applicable numerical value (e.g., −60). Although an actual observed mean signal strength may be "−30 dB ref 1 mW" across all apparatuses, this value might correspond to an RSSI measurement of "−50" in some apparatuses and "−34" in other apparatuses based on manufacturer/model/etc. Therefore, it becomes beneficial for each apparatus that is collecting fingerprint data to collect observed RSSI measurements over time in order to establish statistical characteristics particular to the apparatus. Having this information allows for the normalization of RSSI measurements between fingerprints received from various apparatuses. This information may be collected in a histogram that summarizes observed RSSI values over time. Such histograms may be easy to implement regardless of the abilities of the apparatus. For example, apparatuses may scan for wireless signals and counters may be incremented for each observed RSSI value. These counters may be incremented based on the number of signal received detected at each RSSI value. Signals received from different APs may have the same observed RSSI value, and so the counter corresponding to the observed RSSI value may be increased based on each occurrence of the received signal. For example, if a scan detected wireless signals from five APs having RSSI values of {−59, −38, −90, −48, −38}, the histogram counters (or bins) corresponding to −59, −90 and −48 may be increased by one and the bin corresponding to −38 may be increased by two. In this manner apparatuses may continually accumulate histogram information, possibly even in the background to avoid apparatus operation disruption. The storage requirements for maintaining histograms in apparatuses are very small. For example, in a configuration with 128 RSSI bins in the range [0,−127], and for each bin there is a 32-bit (4 byte) counter to accommodate more than 4 billion samples, the storage requirement for the histogram would be a negligible 512 bytes. Using a 32-bit counter means that even if the counter for a given bin would be incremented by 10 every second, the counter would roll-over only after 14 years, which provides substantial overhead.

It may be assumed that over time the histogram information will converge to represent a real distribution of RSSI values observed by the terminal. It may then be straightforward to extract key information from the histogram including maximum RSSI value observed by the terminal, minimum RSSI value observed by the terminal (e.g., in order to establish a sensitivity threshold), median RSSI observed by the terminal, mode RSSI observed by the terminal, which may be deemed the most likely RSSI to occur, mean RSSI observed by the terminal and quartile and/or tertile RSSI ranges based on the probability mass in the RSSI histogram. The accumulation of histogram information allows each apparatus to be able to determine the numerical RSSI value corresponding to the "mean RSSI" based on its own observed values, which allows for the normalization of values like "mean RSSI" across various apparatuses.

FIG. 7 discloses an example histogram at 700. Histogram 700 shows that the distribution of RSSI values may be skewed towards low signal strengths. This trend may be expected because, in general, at any given location there are more signal sources that are distant from the terminal than there are close to the terminal. In accordance with at least one embodiment of the present invention, RSSI characteristics may used in at least three ways. Initially, as a part of area model creation fingerprints containing signal sources (e.g., WLAN AP IDs), their corresponding RSSI values and potentially also the location of the fingerprint was recorded may be provided to the mapping database for use in formulating an area model. Apparatuses may also report histogram characteristics (e.g., numerical RSSI values corresponding to min, max, mean, median, mode, quartiles, tertiles, etc.) As previously discussed above, the histogram characteristic information may be utilized by the mapping database, for example, in excluding fingerprints having RSSIs lower than some threshold values (e.g., mean, mode, median, etc.) so that coherent, coverage area models, such as "mean RSSI" coverage area models, can be generated from the fingerprints originating from a variety of end user apparatuses.

When formulating coverage area models for use in determining apparatus position, a mapping database may actually formulate one or more area models. Coverage area models may include information limited to a specific value type (such as "mean") that has been used in generating the coverage area model. In that case only fingerprints that exceed "mean" value have been used in coverage area estimation. Alternatively, the mapping database may maintain several coverage area models for a given AP, each of which models may be based on a limiting value of a different type. In this second example application of histogram characteristic information, apparatuses may submit fingerprints and corresponding histogram information, and the mapping database may determine the particular coverage area model in which the fingerprint should be incorporated based on the histogram characteristic information. In such instances the various coverage area models may correspond to different characteristic information types such as a coverage area map being formulated for use with mean signal information, a coverage area map being formulated for use with median signal information, a coverage area map being formulated for use with mode signal information, etc. It also follows that fingerprints used in formulating mean, median or mode coverage area maps would also be usable in formulating a coverage area map corresponding to at least "minimum signal strength." In a positioning system comprising individual maps, it may be important for an apparatus to first determine a type of coverage area to use.

In this regard, a third example application using histogram characteristic information pertains to position determining operations. In a first example mode of operation apparatuses may simply utilize information derived from their internal histogram to determine what signals should be used for positioning. For example, assume that in positioning the apparatus has a "median" coverage area models for APs proximate to the apparatus. Now, based on the information derived from the histogram the apparatus knows the numerical RSSI corresponding to "median RSSI" (e.g., −60) for that particular apparatus. The apparatus may then select only those APs for positioning whose observed RSSI exceeds −60. Apparatuses may also request positioning assistance from a mapping database in order to determine types of coverage area models that are available for positioning including, for example, whether the available coverage area models are based on >mean RSSI values, >minimum RSSI values, etc. In at least one example implementation, apparatuses report back all observed APs and possibly histogram characteristics to a mapping database (e.g., server). Based on the coverage area models that are available for reported APs, the mapping database may then decide the coverage area models (mean, mode, median, etc.) that should be used by the requesting apparatuses. Alternatively, apparatuses may report back only those APs for which their observed RSSI exceeds a threshold value such as "median RSSI" based on the terminal's histogram characteristics. Reporting apparatuses may also request certain parameters such as consideration of "median coverage areas." In accordance with at least one embodiment of the present invention, when providing positioning assistance the mapping database may also instruct apparatuses to report only APs for which an observed RSSI exceeds a "median RSSI" threshold. Apparatus position may then be determined based on only the subset of APs for which the RSSI exceeds the RSSI threshold value.

In an example of system operation, apparatuses in an area may collect fingerprints. Fingerprints may contain the location where the fingerprint was recorded, identification of the signal sources (e.g., WLAN AP IDs) heard at the location and the corresponding RSSI values. When apparatuses report fingerprints to a mapping database, these fingerprints may be reported along with apparatus-specific histogram characteristics such as RSSI values corresponding to minimum, maximum, mode, mean, median, quartiles (ranges), tertiles (ranges) observed by the particular reporting apparatus.

The mapping database may receive fingerprints from a multitude of apparatuses. In instances where the mapping database is configured to consider "mode" coverage areas, for a given observed signal source (e.g., WLAN AP) the database may only consider those fingerprints that have RSSI values above the "mode" threshold level. Although actual numerical RSSI values that may correspond to "mode" may vary from apparatus to apparatus, the terminal-specific information received with each report allows for filtering, normalizing, etc. of the data in the received fingerprints.

Apparatuses that desire to perform positioning may do so based on their own internal information, or via assistance from the mapping database. Apparatuses that rely on their own internal information may derive information from an internal histogram (e.g., mean, mode or minimum RSSI) that allows them to filter out only access points for use in positioning that have RSSI levels above a threshold value. When remote resources (e.g., a mapping database) are relied upon to provide positioning assistance, apparatuses may provide characteristic information to the mapping database. Other information may also be provided instead of, or along with, the characteristic information such as a list of observed APs. The mapping database may then send information back to the apparatus to assist in positioning. For example, the mapping database may indicate an appropriate type of coverage area model (e.g., mean, mode, median, etc.) for the apparatus to use in positioning, or may even select APs to utilize for positioning. Alternatively, radiomaps (e.g., a collection of coverage area models) may be transmitted to apparatuses for use in positioning. When apparatuses commence position determination, an initial check may be made as to whether the radiomap received from the mapping database includes a coverage area map calibrated based on "mode" average information. If a mode map is present, apparatuses may scan for signals and obtain RSSI values for observed signals corresponding to signal sources (e.g., WLAN APs). Apparatuses may then verify, based on internal histogram, which RSSI values are above the threshold in the mode area model. Apparatuses may only consider APs whose RSSI value exceed this mode signal strength threshold. The APs that exceed this threshold may then be used in determining apparatus position.

Figure 8A:
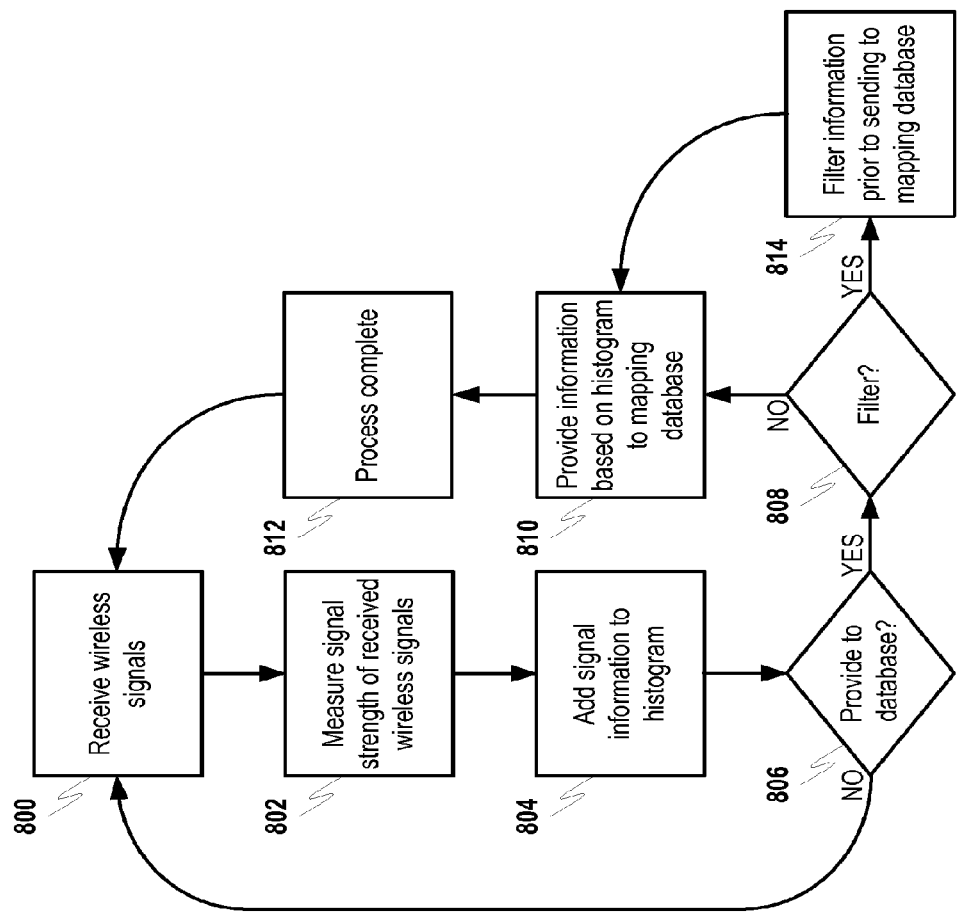
FIG. 8A discloses a flowchart for an example histogram creation and transmission process in accordance with at least one embodiment of the present invention.

A flowchart of an example histogram creation and management process, in accordance with at least one embodiment of the present invention, is disclosed in FIG. 8A. In step 800 an apparatus may receive wireless signals. The reception of signals in step 800 may optionally include identification of a source for the received signals based on information (e.g., WLAN AP ID) contained in the signals. Received signal strength may then be measured in step 802, for example, in terms of RSSI. The process may then move to step 804 where the signal strength information is added to a histogram in the apparatus. A determination may then be made in step 806 as to whether information from the histogram should be provided to a mapping database. This decision may be based on various factors including, for example, time parameters (e.g., interval or duration from the last provision of information to the mapping database), an amount of data collected, the need for apparatuses to interact with the mapping database (e.g., to request positioning assistance), etc. If the information should not be provided to the mapping database at this time, then the process may return to step 800 in preparation for the next scan for/receipt of wireless signals in the apparatus (e.g., to continue information collection).

Alternatively, if it is determined in step 806 that the information in the apparatus should be reported to the mapping database, the process may proceed to step 808 where a further determination may be made as to whether the information observed by the apparatus should further be filtered before being provided to the database. In accordance with various embodiments of the present invention, filtering may take place either at the apparatus level or at the database level. If no filtering is deemed necessary, then in step 810 information based on the histogram may be provided to the mapping database. This information may include, for example, observed RSSI for signals received in the apparatus, identified sources corresponding to each signal, other fingerprint information (e.g., the position of the apparatus when the signals were received) and characteristic information derived from the histogram such as maximum RSSI, minimum RSSI, mean RSSI, median RSSI, mode RSSI, and at least one of quartile and/or tertile RSSI ranges based on signal strength probability mass. The process may then terminate in step 812 and may return to step 800 in preparation for receiving new wireless signals. Alternatively, if in step 808 a determination is made that filtering is necessary prior to transmitting the information to the mapping database, then filtering may proceed in step 814. Filtering may include, for example, determining which APs have observed RSSI measurements above a certain threshold value (e.g., mean, median, mode), and sending only the information associated with these APs to the mapping database in step 810. For example, the presence of a certain AP may be observed in several different fingerprints. In such circumstances it may happen that a subset of the fingerprints get reported (e.g., fingerprints in which the RSSI observed for the AP exceeds the specified threshold). The process may then terminate in step 812 and return to step 800 as previously described.

Figure 8B:
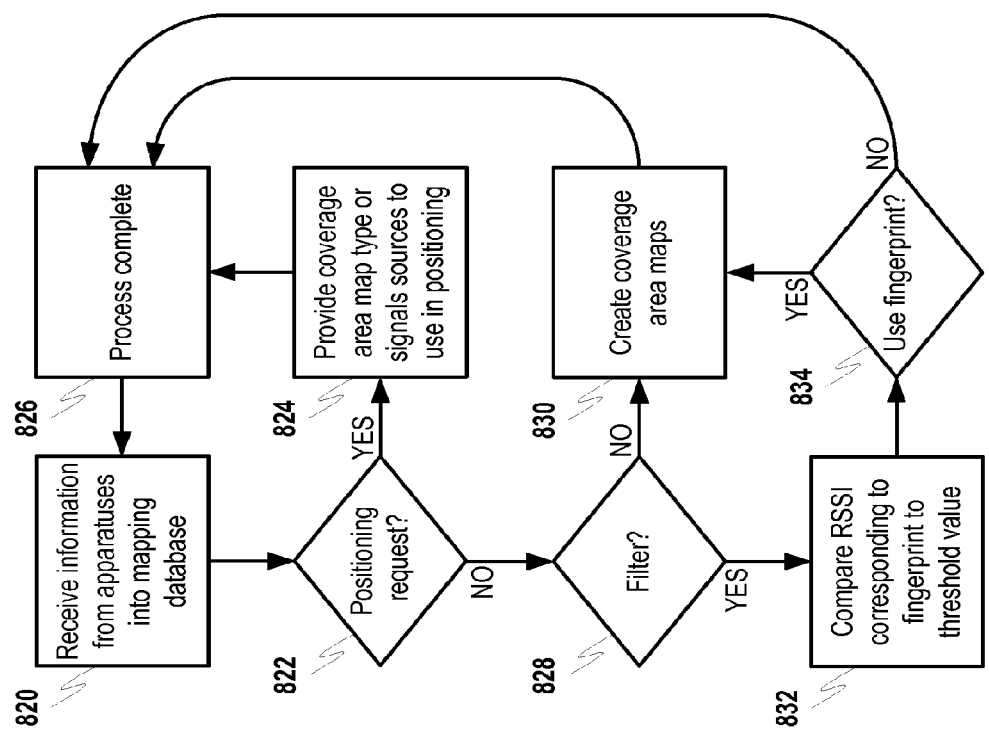
FIG. 8B discloses a flowchart for an example mapping database interaction process in accordance with at least one embodiment of the present invention.

Another process directed to activities performed by a mapping database, in accordance with at least one embodiment of the present invention, is disclosed in FIG. 8B. In step 820 the mapping database may receive information from other apparatuses. Interaction with the mapping database may serve at least two different functions. Other apparatuses may provide information to the mapping database for use in formulating coverage area maps, or other apparatuses may request positioning assistance (e.g., help with determining the current position of the apparatus). In step 822 a determination is made to determine the subject functionality. If positioning assistance is being requested in step 822, then in step 824 information may be provided from the requesting apparatus (e.g., identified APs proximate to the requesting apparatus, information derived from the histogram of the requesting apparatus, etc.) to which the mapping database may respond. For example, the mapping database may provide a coverage area map type (e.g., mode, mean, median) for use in selecting appropriate APs for use in positioning. Alternatively, the mapping database may provide the identification of particular APs whose signals the apparatus should use when estimating position. In this latter instance, the mapping database may perform the filtering/selection processes for the apparatus and just respond with the actual APs to use in positioning. The process may then be complete in step 826 and may return to step 820 in preparation for further information provided by apparatuses.

If in step 822 it is determined that information is being received in the mapping database for use in formulating coverage area maps, then in step 828 a further determination may be made as to whether the information should first be filtered before inclusion in coverage area map formulation. If no filtering is determined to be required in step 828, the process may proceed directly to coverage area map formulation in step 830. The process may then terminate in step 826 and return to step 820 in preparation for the next receipt of information. If filtering is determined to be required in step 828, then in step 832 consideration of whether the received fingerprint information should be included in coverage area map formulation may first be conducted before moving to step 830. As previously discussed, the mapping database may perform filtering to determine whether received fingerprint information has a corresponding observed RSSI value that is above a threshold value (e.g., mode, mean, median RSSI value), the threshold value being derived from the histogram information received along with the fingerprints. If the RSSI value corresponding to the fingerprint exceeds the threshold value, then the fingerprint may be acceptable for use in coverage area map formulation. Further to filtering step 832, a determination may be made in step 834 as to whether the fingerprint should be used in coverage area map formulation. If the fingerprint should be used, the process may return to step 830 for coverage area map formulation. Otherwise, the process may then terminate in step 826 and may return to step 820 in preparation for further information provided by apparatuses.

While various example configurations of the present invention have been disclosed above, the present invention is not strictly limited to the previous embodiments.

For example, the present invention may include, in accordance with at least one example embodiment, an apparatus comprising means for receiving wireless signals in an apparatus, means for determining a signal strength for each received wireless signal, and means for accumulating an occurrence for each received wireless signal based on the determined signal strength in a histogram maintained within the apparatus.

At least one other example embodiment of the present invention may include, in accordance with at least one example embodiment, an apparatus comprising means for receiving from apparatuses at least signal source identification and information derived from signal strength histograms at a mapping database, and means for creating coverage area maps in the mapping database corresponding to the identified signal sources utilizing at least the received identities and information.

At least one other example embodiment of the present invention may include electronic signals that cause apparatuses to receive wireless signals, determine a signal strength for each received wireless signal, and accumulate an occurrence for each received wireless signal based on the determined signal strength in a histogram maintained within the apparatus.

At least one other example embodiment of the present invention may include electronic signals that cause apparatuses to receive from apparatuses at least signal source identification and information derived from signal strength histograms at a mapping database, and create coverage area maps in the mapping database corresponding to the identified signal sources utilizing at least the received identities and information.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    receiving, at a mapping database, from apparatuses at least signal source identification and information derived from signal strength histograms, each histogram comprising a range of signal strength values divided into a series of consecutive, non-overlapping signal strength bins, wherein each histogram records a total number of occurrences of signal strength values of signals received from multiple signal sources observed by an apparatus of said apparatuses at a respective observing location that fall into each signal strength bin;
    creating, by the mapping database, coverage area maps in the mapping database corresponding to the identified signal sources utilizing at least the received signal source identities and information derived from said signal strength histograms,
    wherein the coverage area maps are created using only received information with a signal strength that is above a threshold value, and
    wherein the threshold value is at least one of a median signal strength, mode signal strength or mean signal strength;
    receiving from a requesting apparatus a request for positioning assistance at the mapping database; and
    transmitting at least one of a coverage area map type of the coverage area maps to utilize in positioning or identities of signal sources to which the coverage area maps correspond to utilize in positioning to the requesting apparatus, wherein the map type is at least one of a median type, a mode type or a mean type.

2. The method of claim 1, further comprising:
    transmitting the identity identities of particular signal sources to which the coverage area maps correspond to utilize in positioning to the requesting apparatus.

3. A computer program product comprising computer executable program code recorded on a non-transitory computer readable storage medium, the computer executable program code configured to, when executed by at least one processor, cause an apparatus to:
    receive, at a mapping database, from apparatuses at least signal source identification and information derived from signal strength histograms, each histogram comprising a range of signal strength values divided into a series of consecutive, non-overlapping signal strength bins, wherein each histogram records a total number of occurrences of signal strength values of signals received from multiple signal sources observed by an apparatus of said apparatuses at a respective observing location that fall into each signal strength bin;
    create coverage area maps in the mapping database corresponding to the identified signal sources utilizing at least the received signal source identities and information derived from said signal strength histograms,
    wherein the coverage area maps are created using only received information having a corresponding signal strength that is above a threshold value, and
    wherein the threshold value is at least one of a median signal strength, mode signal strength or mean signal strength;
    receive from a requesting apparatus a request for positioning assistance at the mapping database; and
    transmit at least one of a coverage area map type of the coverage area maps to utilize in positioning or identities of signal sources to which the coverage area maps correspond to utilize in positioning to the requesting apparatus, wherein the map type is at least one of a median type, a mode type or a mean type.

4. The computer program product of claim 3, wherein the computer program code is further configured to, in cooperation with the at least one processor, cause the apparatus to transmit identities of particular signal sources to which the coverage area maps correspond to utilize in positioning to the requesting apparatus.

5. An apparatus, comprising:
    at least one processor; and
    at least one memory including executable instructions, the at least one memory including computer program code configured to, in cooperation with the at least one processor, cause the apparatus to perform at least the following:

receive, at a mapping database, from apparatuses at least signal source identification and information derived from signal strength histograms, each histogram comprising a range of signal strength values divided into a series of consecutive, non-overlapping signal strength bins, wherein each histogram records a total number of occurrences of signal strength values of signals received from multiple signal sources observed by an apparatus of said apparatuses at a respective observing location that fall into each signal strength bin;

create coverage area maps in the mapping database corresponding to the identified signal sources utilizing at least the received signal source identities and information derived from said signal strength histograms, wherein the coverage area maps are created using only received information having a corresponding signal strength that is above a threshold value, and wherein the threshold value is at least one of a median signal strength, mode signal strength or mean signal strength;

receive from a requesting apparatus a request for positioning assistance at the mapping database; and transmit at least one of a coverage area map type of the coverage area maps to utilize in positioning or identities of signal sources to which the coverage area maps correspond to utilize in positioning to the requesting apparatus, wherein the map type is at least one of a median type, a mode type or a mean type.

6. The apparatus of claim 5, wherein the at least one memory and the computer program code are further configured to, in cooperation with the at least one processor, cause the apparatus to transmit identities of particular signal sources to which the coverage area maps correspond to utilize in positioning to the requesting apparatus.

* * * * *